United States Patent
Kotturu et al.

(10) Patent No.: US 8,607,145 B2
(45) Date of Patent: Dec. 10, 2013

(54) SHOW OOB AND SPEED NEGOTIATION DATA GRAPHICALLY IN A NETWORK DIAGNOSTIC COMPONENT

(75) Inventors: Venkata Rama Mohana Rao Kotturu, San Jose, CA (US); Kiranmai Vedanabhatla, San Jose, CA (US)

(73) Assignee: JDS Uniphase Corporation, Milpitas, CA (US)

(*) Notice: Subject to any disclaimer, the term of this patent is extended or adjusted under 35 U.S.C. 154(b) by 1262 days.

(21) Appl. No.: 12/061,356

(22) Filed: Apr. 2, 2008

(65) Prior Publication Data

US 2008/0189641 A1  Aug. 7, 2008

Related U.S. Application Data (63) Continuation-in-part of application No. 11/675,041, filed on Feb. 14, 2007, and a continuation-in-part of application No. 11/675,045, filed on Feb. 14, 2007.

(60) Provisional application No. 60/779,040, filed on Mar. 3, 2006, provisional application No. 60/773,515, filed on Feb. 14, 2006, provisional application No. 60/909,684, filed on Apr. 2, 2007.

(51) Int. Cl.
*G06F 3/00* (2006.01)

(52) U.S. Cl.
USPC ........... 715/733; 715/734; 715/736; 370/241; 370/464

(58) Field of Classification Search
USPC ................ 370/241, 464; 715/733, 734, 736
See application file for complete search history.

(56) References Cited

U.S. PATENT DOCUMENTS

| | | | |
|---|---|---|---|
| 5,304,990 A | 4/1994 | Rebourg et al. |
| 5,850,388 A | 12/1998 | Anderson et al. |
| 5,946,301 A | 8/1999 | Swanson et al. |
| 6,011,778 A | 1/2000 | Kilkki et al. |
| 6,128,715 A | 10/2000 | Wang et al. |
| 6,205,190 B1 | 3/2001 | Antonio et al. |
| 6,268,808 B1 | 7/2001 | Iryami et al. |
| 6,385,297 B2 | 5/2002 | Faulkner et al. |

(Continued)

FOREIGN PATENT DOCUMENTS

| | | |
|---|---|---|
| CN | 200780010952 | 9/2010 |
| EP | 07757009.1 | 8/2010 |

(Continued)

OTHER PUBLICATIONS

U.S. Appl. No. 11/675,046, filed Feb. 14, 2007, Milne et al.

(Continued)

*Primary Examiner* — William Bashore
*Assistant Examiner* — David Choi
(74) *Attorney, Agent, or Firm* — Volentine & Whitt, PLLC (57) ABSTRACT

A network diagnostic component that is placed in-line between two nodes in a network. The network diagnostic component receives a low speed signal pattern from the first node for communication with the second node; records the low speed signal pattern in a memory; writes one or more markers specifying information about the low speed signal pattern in the memory; interprets the one or more markers to ascertain the type and duration of the low speed signal pattern; and displays a graphical representation of the low speed signal pattern based on the interpretation of the one or more markers.

19 Claims, 9 Drawing Sheets

(56) References Cited

U.S. PATENT DOCUMENTS

| | | |
|---|---|---|
| 6,429,811 B1 | 8/2002 | Zhao et al. |
| 6,510,156 B1 | 1/2003 | Brock et al. |
| 6,526,362 B2 | 2/2003 | Jones et al. |
| 6,618,360 B1 | 9/2003 | Scoville et al. |
| 6,687,641 B2 | 2/2004 | Jones |
| 6,715,105 B1 | 3/2004 | Rearick |
| 6,868,495 B1 | 3/2005 | Glover |
| 7,103,050 B1 | 9/2006 | Luijten et al. |
| 7,281,167 B2 | 10/2007 | Dube |
| 7,539,489 B1 | 5/2009 | Alexander |
| 7,599,293 B1 | 10/2009 | Bain et al. |
| 2001/0039580 A1 | 11/2001 | Walker et al. |
| 2002/0064255 A1 | 5/2002 | Mohammadian et al. |
| 2002/0112044 A1 | 8/2002 | Hessmer et al. |
| 2003/0028509 A1 | 2/2003 | Sah et al. |
| 2003/0033397 A1 | 2/2003 | Gurumoorthy et al. |
| 2003/0081125 A1 | 5/2003 | Sheldon et al. |
| 2003/0142629 A1 | 7/2003 | Krishnamurthi et al. |
| 2003/0212694 A1 | 11/2003 | Potapov et al. |
| 2003/0224797 A1 | 12/2003 | Kuan et al. |
| 2004/0006574 A1 | 1/2004 | Witkowski et al. |
| 2004/0049596 A1 | 3/2004 | Schueler |
| 2004/0054776 A1 | 3/2004 | Klotz et al. |
| 2004/0057389 A1 | 3/2004 | Klotz et al. |
| 2004/0170383 A1 | 9/2004 | Mazur |
| 2004/0208501 A1 | 10/2004 | Saunders et al. |
| 2004/0215421 A1 | 10/2004 | Schmitz et al. |
| 2004/0225729 A1 | 11/2004 | Sabiers et al. |
| 2005/0060402 A1 | 3/2005 | Oyadomari et al. |
| 2005/0071445 A1 | 3/2005 | Siorek et al. |
| 2005/0232635 A1* | 10/2005 | Aronson et al. ............ 398/135 |
| 2006/0061369 A1 | 3/2006 | Marks et al. |
| 2006/0095630 A1 | 5/2006 | Bashford et al. |
| 2006/0117189 A1 | 6/2006 | Chiu et al. |
| 2006/0153177 A1 | 7/2006 | Worrall et al. |
| 2006/0168207 A1 | 7/2006 | Choong et al. |
| 2006/0198312 A1* | 9/2006 | Schondelmayer et al. ... 370/241 |
| 2006/0198318 A1* | 9/2006 | Schondelmayer et al. ... 370/252 |
| 2006/0198319 A1* | 9/2006 | Schondelmayer et al. ... 370/252 |
| 2006/0224822 A1 | 10/2006 | Blomquist et al. |
| 2007/0061681 A1 | 3/2007 | Carmichael |
| 2007/0299999 A1 | 12/2007 | Duerk et al. |
| 2008/0052586 A1 | 2/2008 | Rajski et al. |

FOREIGN PATENT DOCUMENTS

| | | |
|---|---|---|
| WO | WO 01/01272 | 1/2001 |
| WO | WO 02/087124 | 10/2002 |
| WO | PCT/US07/062162 | 6/2008 |

OTHER PUBLICATIONS

U.S. Appl. No. 11/675,045, filed Feb. 14, 2007, Vedanabhatla et al.
U.S. Appl. No. 11/675,041, filed Feb. 14, 2007, Vedanabhatla et al.
U.S. Appl. No. 11/675,036, filed Feb. 14, 2007, Gentieu et al.
Working Draft American National Standard, Serial Attcahed SCSI-1.1 (SAS-1.1)' Specification, Revision Mar. 4, 2004.
Compression and Decompressing Data Using Java APIs' by Mahmoud et al., Feb. 2002.
LeCroy's 'SASTracker' Datasheet, copyright 2006.
LeCroy's 'SAS InFusion and SATA in Fusion Error Injector and Traffic Modifier' Datasheet, copyright 2005.
Penokie, George, Alternate SAS Speed Negotiation State Diagram, Oct. 10, 2002, T10/02-405 Rev. 0, T10 Committee (SCSI).
Elliot, Rob, Serial Attached SCSI Phy Layer, Sep. 30, 2003, HP Industry Standard Servers, SCSI Trade Association.
U.S. Appl. No. 11/675,046, filed Mar. 19, 2010, Final Office Action.
U.S. Appl. No. 11/675,046, filed Jul. 7, 2009, Office Action.
U.S. Appl. No. 11/675,045, filed Mar. 23, 2010, Final Office Action.
U.S. Appl. No. 11/675,045, filed Jul. 17, 2009, Office Action.
U.S. Appl. No. 11/675,045, filed Oct. 29, 2008, Office Action.
U.S. Appl. No. 11/675,041, filed Mar. 2, 2010, Final Office Action.
U.S. Appl. No. 11/675,041, filed Jun. 24, 2009, Office Action.
U.S. Appl. No. 11/675,036, filed Mar. 24, 2010, Final Office Action.
U.S. Appl. No. 11/675,036, filed Sep. 4, 2009, Office Action.
Dr. Thomas Porter: "The Perils of Deep Packet Inspection" SecurityFocus.com Jan. 11, 2005.
Sundaresan and Moussa, "Algorithms and programming models for efficient representation of XML for Internet applications," Computer Networks (2002).
U.S. Appl. No. 11/675,045, filed Jul. 27, 2010, Office Action.
U.S. Appl. No. 11/675,041, filed Oct. 6, 2010, Office Action.

* cited by examiner

SHOW OOB AND SPEED NEGOTIATION DATA GRAPHICALLY IN A NETWORK DIAGNOSTIC COMPONENT

CROSS-REFERENCE TO RELATED APPLICATIONS

This patent application is a Continuation-in-Part of U.S. patent application Ser. No. 11/675,041, filed Feb. 14, 2007, which claims the benefit of U.S. Provisional Application No. 60/779,040, filed Mar. 3, 2006. This patent application is also a Continuation-in-Part of U.S. patent application Ser. No. 11/675,045, filed Feb. 14, 2007, which claims the benefit of U.S. Provisional Application No. 60/773,515, filed Feb. 14, 2006. This patent application also claims the benefit of U.S. Provisional Application No. 60/909,684, filed Apr. 2, 2007. All of the aforementioned patent applications are incorporated herein by reference in their entirety.

BACKGROUND

Computer and data communications networks continue to proliferate due to declining costs, increasing performance of computer and networking equipment, and increasing demand for communication bandwidth. Communications networks— including wide area networks ("WANs"), local area networks ("LANs"), metropolitan area networks ("MANs"), and storage area networks ("SANS")—allow increased productivity and use of distributed computers or stations through the sharing of resources, the transfer of voice and data, and the processing of voice, data and related information at the most efficient locations. Moreover, as organizations have recognized the economic benefits of using communications networks, network applications such as electronic mail, voice and data transfer, host access, and shared and distributed databases are increasingly used as a means to increase user productivity. This increased demand, together with the growing number of distributed computing resources, has resulted in a rapid expansion of the number of installed networks.

As the demand for networks has grown, network technology has developed to the point that many different physical configurations presently exist. Examples include Gigabit Ethernet ("GE"), 10 GE, Fiber Distributed Data Interface ("FDDI"), Fibre Channel ("FC"), Synchronous Optical Network ("SONET"), Serial Attached SCSI ("SAS"), Serial Advanced Technology Attachment ("SATA"), and Infini-Band networks. These networks, and others, typically conform to one of a variety of established standards, or protocols, which set forth rules that govern network access as well as communications between and among the network resources. Typically, such networks utilize different cabling systems, have different characteristic bandwidths and typically transmit data at different speeds. Network bandwidth, in particular, has been the driving consideration behind much of the advancements in the area of high speed communication systems, methods and devices.

For example, the ever-increasing demand for network bandwidth has resulted in the development of technology that increases the amount of data that can be pushed through a single channel on a network. Advancements in modulation techniques, coding algorithms and error correction have vastly increased the rates at which data can be transmitted across networks. For example, a few years ago, the highest rate that data could travel across a network was at about one Gigabit per second. This rate has increased to the point where data can travel across various networks such as Ethernet and SONET at rates as high as 10 gigabits per second, or faster.

As communication networks have increased in size, speed and complexity however, they have become increasingly likely to develop a variety of problems that, in practice, have proven difficult to diagnose and resolve. Such problems are of particular concern in light of the continuing demand for high levels of network operational reliability and for increased network capacity.

The problems generally experienced in network communications can take a variety of forms and may occur as a result of a variety of different circumstances. Examples of circumstances, conditions and events that may give rise to network communication problems include the transmission of unnecessarily small frames of information, inefficient or incorrect routing of information, improper network configuration and superfluous network traffic, to name just a few. Such problems are aggravated by the fact that networks are continually changing and evolving due to growth, reconfiguration and introduction of new network topologies and protocols. Moreover, new network interconnection devices and software applications are constantly being introduced and implemented. Circumstances such as these highlight the need for effective, reliable, and flexible diagnostic mechanisms.

BRIEF SUMMARY

Embodiments disclosed herein relate to a network diagnostic component that is placed in-line between two nodes in a network. The network diagnostic component receives a low speed signal pattern from the first node for communication with the second node; records the low speed signal pattern in a memory writes one or more markers specifying information about the low speed signal pattern in the memory interprets the one or more markers to ascertain the type and duration of the low speed signal pattern; and displays a graphical representation of the low speed signal pattern based on the interpretation of the one or more markers.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teaching herein. The features and advantages of the teaching herein may be realized and obtained by means of the instruments and combinations particularly pointed out in the appended claims. These and other features will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

The embodiments disclosed herein may be practiced in networking systems, including the testing of high speed data transmission systems and components. Embodiments described herein may also be used in other contexts unrelated to testing systems and components and/or unrelated to high speed data transmission. An example networking system will first be described. Then, the operation in accordance with specific embodiments disclosed herein will be described. Note that as used herein, the terms "first", "second" and so forth are not intended to imply sequential ordering, but rather are intended to distinguish one element from another unless explicitly stated.

Example Networking System

Figure 1:
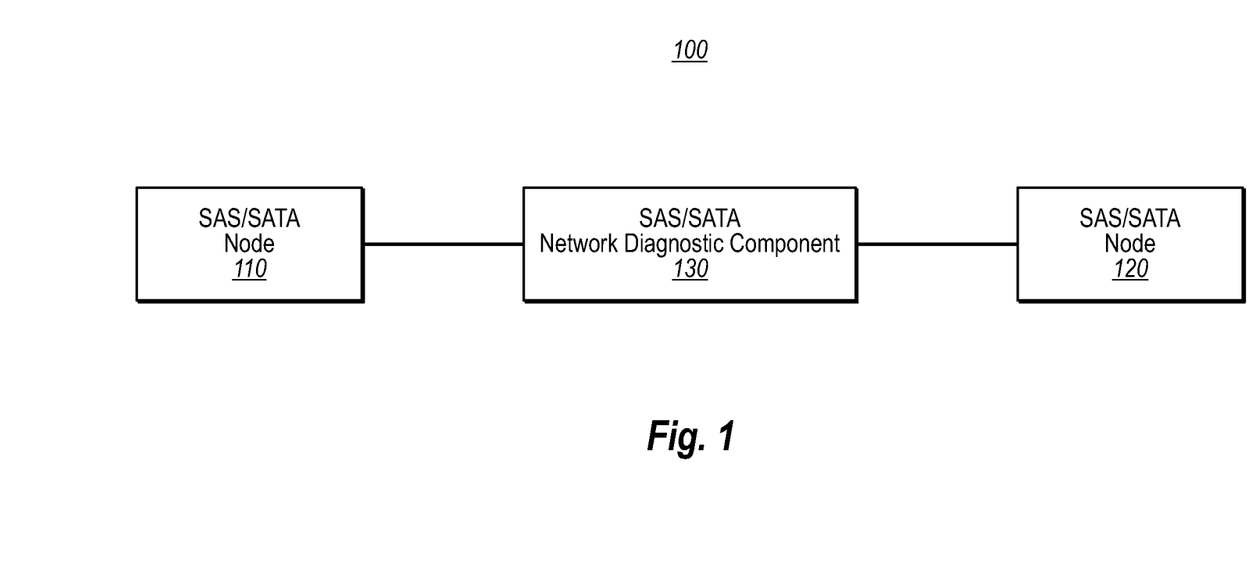
FIG. 1 illustrates a block diagram of a network including a network diagnostic component placed in-line between two nodes.

FIG. 1 is a block diagram of a networking system 100. The networking system 100 may include one or more nodes 110, 120, which communicate with each other via a network. As used herein, a "node" includes, but is not limited to, a server or host; a client or storage device; a switch; a hub; a router; all or a portion of a SAN fabric; a diagnostic device; and any other device or system, or combination thereof, that may be coupled to a network and that may receive and/or monitor a signal or data over at least a portion of a network, that may send and/or generate a signal or data over at least a portion of a network, or both.

In one embodiment, a signal (such as, an electrical signal, an optical signal, and the like) may be used to send and/or receive network messages over at least a portion of a network. As used herein, a "network message" or "network data stream" includes, but is not limited to, a packet; a datagram; a frame; a data frame; a command frame; an ordered set; any unit of data capable of being routed (or otherwise transmitted) through a computer network; and the like. In one embodiment, a network message or data stream may comprise transmission characters used for data purposes, protocol management purposes, code violation errors, and the like.

Also, an ordered set may include, a Start of Frame ("SOF"), an End of Frame ("EOF"), an Idle, a Receiver_Ready ("R_RDY"), a Loop Initialization Primitive ("LIP"), an Arbitrate ("ARB"), an Open ("OPN"), and Close ("CLS")—such as, those used in certain embodiments of Fibre Channel. Of course, any ordered sets and/or any network messages of any other size, type, and/or configuration may be used, including, but not limited to, those from any other suitable protocols.

Nodes may communicate using suitable network protocols, including, but not limited to, serial protocols, physical layer protocols, channel protocols, packet-switching protocols, circuit-switching protocols, Ethernet, Fast Ethernet, Gigabit Ethernet, 10 Gigabit Ethernet, Fibre Channel, Fibre Channel Arbitrated Loop ("FC-AL"), Small Computer System Interface ("SCSI"), High Performance Parallel Interface ("HIPPI"), Serial Attached SCSI ("SAS"), Serial ATA ("SATA"), Serial SCSI Architecture ("SSA"), and the like. In this description and in the claims, protocol is defined to mean at least the speed at which the nodes communicate and the communication rules that are used by the nodes when communicating.

As shown in FIG. 1, the nodes 110,120 are preferably SAS/SATA nodes. As used herein, "SAS/SATA nodes" includes nodes that are SAS compatible, nodes that are SATA compatible, and nodes that are both SAS compatible and SATA compatible. It will be appreciated, however, that the nodes 110,120 need not be SATA/SATA nodes and that the nodes 110,120 may be other types of nodes that are compatible with other types of network protocols. In addition, any reference to a node as being a host or initiator node and another node as being a target node is for illustration only. It is contemplated that nodes 110, 120 can be both host and target nodes as circumstances warrant.

The networking system 100 may comprise a network, network diagnostic system, a network testing system, or the like including network diagnostic components (such as network diagnostic component 130), which may be configured to communicate network messages among nodes. For example, the network diagnostic component 130 may be inserted between the nodes 110,120 such that network messages sent between the nodes 110, 120 are available to network diagnostic component 130 and/or are routed through the network diagnostic component 130. As used herein, "in-line" denotes that a network diagnostic component is configured to have the network messages sent between two nodes routed to it so that the network messages are available to the network diagnostic component. In some embodiments the network diagnostic component may be directly in-line or it may be indirectly in-line through the use of a tap or like device. In still other embodiments, the network diagnostic component may have the network messages routed to it in any reasonable way.

In further detail, the network diagnostic component 130 may send and receive signals or data. Accordingly, using a signal, the network diagnostic component 130 may receive one or more network messages from a node, send one or more network messages to a node, or both. For example, the network diagnostic component 130 may receive one or more network messages sent between the nodes 110,120. The network diagnostic component 130 may also retransmit those network messages. In particular, the network diagnostic component 130 may receive network messages sent from the node 110 and then retransmit them to the node 120. Also, the network diagnostic component 130 may receive network messages sent from the node 120 and then retransmit them to the node 110.

Prior to retransmitting these network messages, the network diagnostic component 130 can modify the signal used to transmit the network messages. For example, the network diagnostic component 130 may digitally retime the signal, may modify the content of the messages themselves, or both. It will be appreciated that the network diagnostic component 130 may modify the signal in other desired ways. Because it is not always desirable to have the network diagnostic component 130 modify the signal, the network diagnostic component 130 may be selectively configured to modify (or not to modify) the signal used to transmit the network messages.

The network diagnostic component 130 may also perform a variety of network diagnostic functions using network messages sent between the nodes 110,120. In performing some of these diagnostic functions, the network diagnostic component 130 may be configured to be passive to the network messages. If desired, the network diagnostic component 130 may receive at least some of the network messages, and may transmit some or all of the received traffic. In performing other diagnostic functions, the network diagnostic component 130 may be configured to modify some or all of the network traffic.

As shown in FIG. 1, the network diagnostic component 130 is preferably a SAS/SATA network diagnostic component. As used herein, "SAS/SATA network diagnostic components" includes network diagnostic components that are SAS compatible, network diagnostic components that are SATA compatible, and network diagnostic components that are both SAS compatible and SATA compatible. It will be appreciated, however, that the network diagnostic component 130 need not be a SAS/SATA network diagnostic component and that the network diagnostic component 130 may be another type of network diagnostic component that is compatible with other types of network protocols. In fact, the network diagnostic component 130 may be configured to perform its functions on any type of network and/or network topology using any number of network protocols.

Out-Of-Band Sequence and Speed Negotiation

In many applications, nodes 110 and node 120 may have periods of time when they communicate using a low speed signal pattern. Typically, the low speed signal patterns include full-amplitude Data Burst periods and zero amplitude common mode voltage periods where no data is transmitted. Such data patterns are "low speed" in the sense that they as generally slower than regular data transmission. A typical example of such a low speed signal pattern is the Out-of-Band signals (OOB) common in such protocols as SAS and SATA. Of course, one skilled in the art will recognize that there are numerous other protocols with low speed signal patterns as described above.

Often, nodes 110 and 120 undergo an initialization process prior to communicating with each other. This initialization process allows the two nodes to agree upon the protocol (e.g., speed and/or communication rules) that the nodes will utilize while communicating with each other. As mentioned above, many nodes are configured to use both the SAS protocol and the SATA protocol. In such cases, it is often necessary during the initialization process for the nodes to specify whether they will be communicating using the SAS protocol or the SATA protocol.

Figure 4:
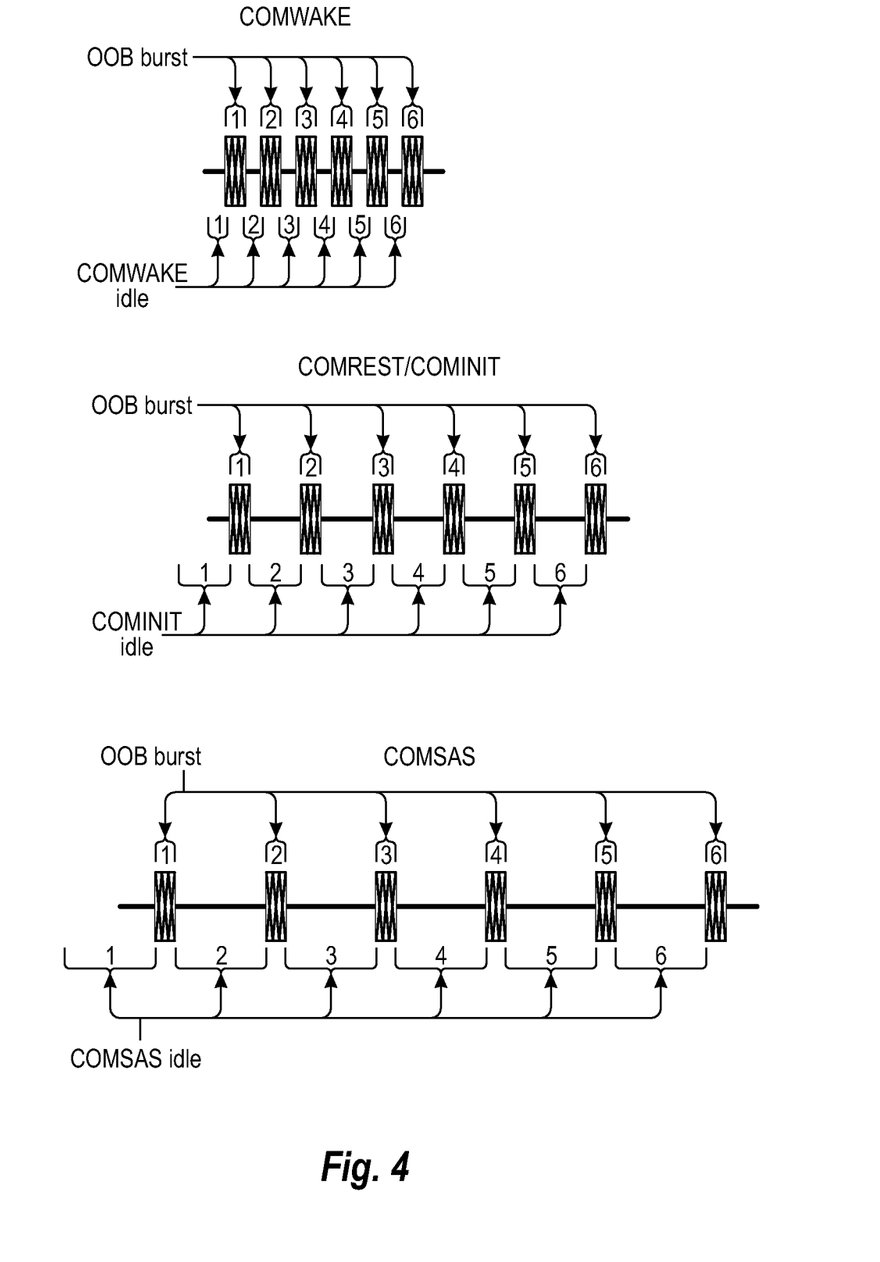
FIG. 4 illustrates Data Burst and DC-Idle portions of various SAS and SATA OOB signals.

The communication rules are specified as part of the initialization process by low speed Out-Of-Band (OOB) signals that are defined by the SAS and SATA protocols. OOB signals constitute defined periods of DC-Idle (common mode voltage) followed by defined periods of Data Bursts. The defined periods are specified by the SAS and SATA protocols. The Data Burst period is the same for all the OOB signals. The DC-Idle period, however, varies and is used to differentiate between the different kinds of OOB signals. For example, the Data Bursts and DC-Idles are defined in terms of an OOB Interval (OOBI), which at 1.5 Gigabits per second (Gbps) is nominally 666.666 picoseconds. The time periods for the Data Bursts and DC-Idles of various SAS and SATA OOB signals are summarized in Table 1. A graphical representation of the Data Burst and DC-Idle portions of the various SAS and SATA OOB signals is illustrated in FIG. 4.

TABLE 1

| Signal | Burst Time | DC-Idle Time |
|---|---|---|
| COMWAKE | 160 OOBI | 160 OOBI |
| COMINIT/COMRESET | 160 OOBI | 480 OOBI |
| COMSAS | 160 OOBI | 1440 OOBI |

Node 110, when desiring to utilize the SAS protocol, may send OOB signals designated as COMINIT/COMRESET (COMINIT/COMRESET are electrically identical signals) and COMSAS to node 120. As shown in Table 1 and FIG. 4, these OOB signals have defined Data Burst periods and defined DC-idle periods that indicate the signal type. Upon receipt of these OOB signals, node 120 will be informed that node 110 desires to communicate using the SAS protocol. The node 120 may then respond appropriately.

In similar manner, if node 110 wishes to utilize the SATA protocol, it may send the COMINIT/COMRESET OOB signal and a COMWAKE OOB signal to node 120. As with the other OOB signals previously discussed, the COMWAKE signal also has defined Data Burst periods and defined DC-idle periods as also shown in Table 1 and FIG. 4. Upon receipt of these OOB signals, node 120 will be informed that node 110 desires to communicate using the SATA protocol. The node 120 may then respond appropriately.

In some cases, node 110 may not know ahead of time which protocol node 120 may support. In those instances, node 110 may send all of the OOB signals to node 120. Node 120 will then recognize the OOB signals for the protocol that it is configured at that particular time to support and will respond to node 110 appropriately.

The speed of communication, on the other hand, is determined during a speed negotiation sequence that typically follows the OOB sequence. This consists of different speed negotiation windows that often begin at the lowest possible speed and then continue to higher speeds. For example, SAS/SATA nodes typically communicate at 1.5 Gbps, 3 Gbps, 6 Gbps, etc.

For example, in the SAS protocol, node 110 would first send a speed negotiation signal at 1.5 Gbps to node 120. If node 120 recognized the 1.5 Gbps speed negotiation signal, then node 110 would send a speed negotiation signal at 3 Gbps. If node 120 recognized the 3 Gbps speed negotiation signal, then node 110 would send a speed negotiation signal at 6 Gbps. This process would continue until either node 110 had reached its speed limit or there was a speed that node 120 did not recognize. In either case, the fastest speed supported by both nodes would be used.

In the SATA protocol, on the other hand, node 120, which is the SATA target in the illustrated embodiment, would send speed negotiation data at its highest speed first. If node 110 (the SATA host) could synchronize to this speed, then the speed is used. If node 110 could not synchronize, then node 120 would try its next lowest speed until a speed is found that node 110 could synchronize to. For example, node 120 would first send a speed negotiation signal at 6 Gbps. If node 110 could not synchronize to this speed, node 120 would send a speed negotiation signal at 3 Gbps. Note that although the above example was described in relation to using OOB signals in an initialization process, it understood that OOB signals may be sent by nodes 110 and 120 for other purposes as well. In addition, as previously mentioned, nodes 110 and 120 may also communicate using other types of low speed signal patterns as described above.

Capture Timing and Negotiation Data with Repeat Counts

Figure 2:
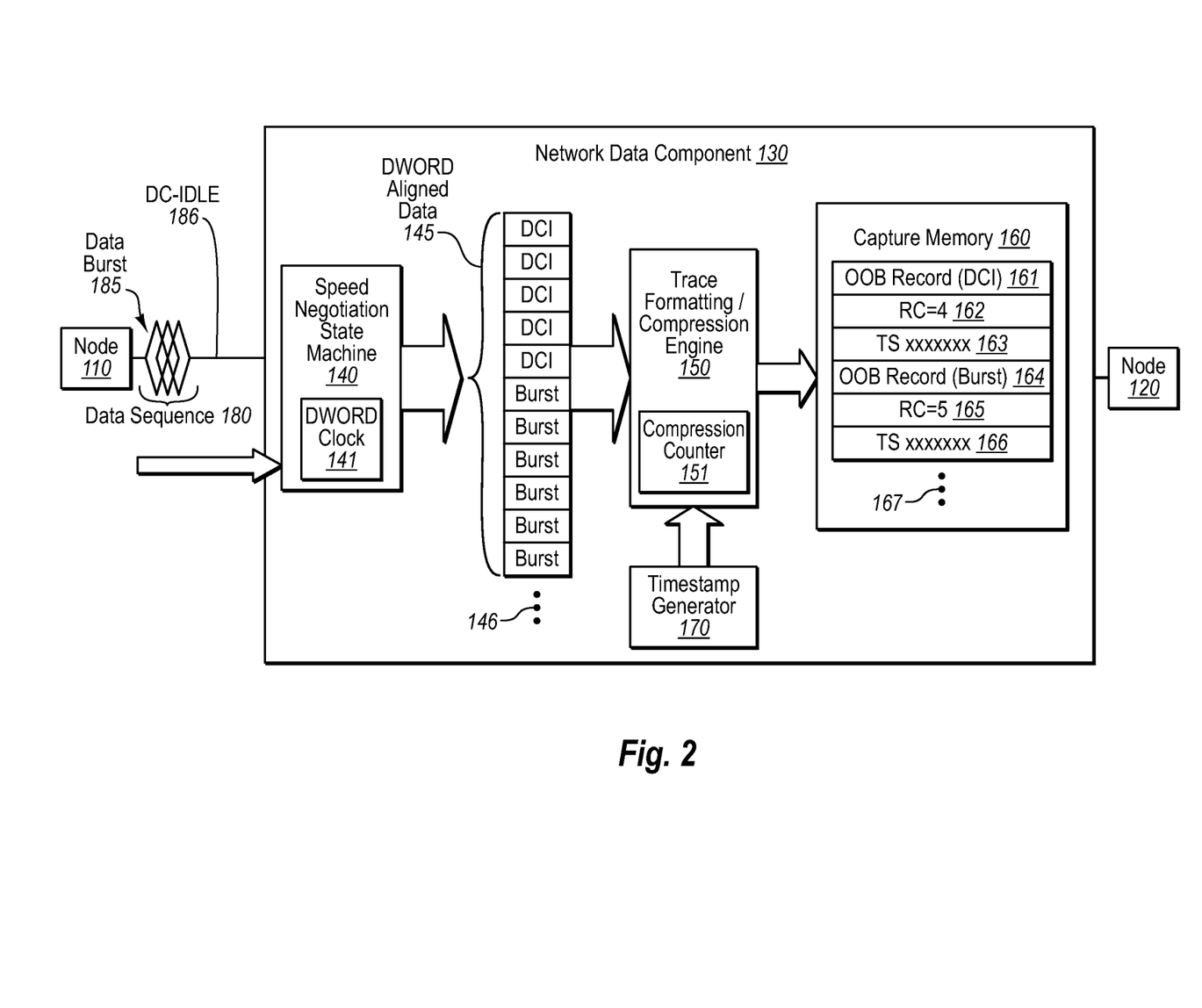
FIG. 2 illustrates a detailed view of a particular embodiment of the network diagnostic component of FIG. 1.

It is often the case, however, that a user of network 100 desires to analyze the timing of the Data Burst and DC-Idle periods of a signal. This is done to ascertain that a proper signal is being received. In some network systems, every individual Dword that comprises a Data Burst or DC-Idle is stored in a memory and then used to ascertain the timing of the signal. This approach can be costly in terms of available memory space as a large number of Dwords may require a large percentage of memory resources. Embodiments described herein allow for network diagnostic component 130 to ascertain the timing of the Data Bursts and DC-Idles without having to store every individual Dword in memory. Such embodiments will be described with reference to FIG. 1, which was previously described, and FIG. 2, which shows a detailed view of one particular embodiment of network diagnostic component 130. Note that the embodiment of FIG. 2 is only one of numerous examples of a network diagnostic component 130 that can be used to implement the embodiments disclosed herein. Although the following embodiments will be described using the SAS and SATA protocols, this is by way of example only and should not be used to limit the scope of the appended claims. Other suitable protocols may also be utilized by the embodiments disclosed herein.

FIG. 2 shows that the embodiment of network diagnostic component 130 includes an Out-of-Band (OOB)/speed negotiation state machine 140, a trace formatting/compression engine 150, a capture memory 160, and a timestamp generator 170. Capture memory 160 may be a buffer in some embodiments and may also be any other type of suitable non-persistent and persistent memory source in other embodiments.

The OOB/speed negotiation state machine 140 may be implemented as any reasonable state machine. The OOB/Speed Negotiation State Machine 140 samples an incoming OOB sequence 180 from the wire using an internal Dword clock 141. The data sequence 180 is made up of Data Bursts 185 and DC-Idles 186 which may correspond to the Data Bursts and DC-idles discussed previously in relation to FIG. 4 and Table 1. Of course, data sequence 180 may also correspond to other low speed signal patterns as described herein.

The OOB/Speed Negotiation State Machine 140 then generates Dword aligned data 145 that represents the DC-idles and Data Burst Dwords that are detected from OOB sequence 180. As illustrated, Dword aligned data 145 includes ellipses 146 that represents that any number of DC-idles and Data Burst Dwords may be included in OOB sequence 180. The Dword aligned data 145 is then passed to the trace formatting/compression engine 150.

The trace formatting/compression engine 150 may be implemented as software, hardware, or any combination of software and hardware. The trace formatting/compression engine 150 is configured to compress the DC-Idles and Data Burst Dwords of Dword aligned data 145 by counting the DC-Idles and Data Burst Dwords and providing a count record to capture memory 160 as will be explained. The trace formatting/compression engine 150 is also configured provide for the insertion of a timestamp into the capture memory.

For example, trace formatting/compression engine 150 reads the first Dword or DC-Idle in Dword aligned data 145 and writes the Dword or DC-Idle to capture memory 160. Any subsequent Dwords or DC-Idles that are the same as the first Dword are counted by a compression counter 151 inside the formatting/compression engine 150. A repeat count record is generated and written into the capture memory 160 when the trace formatting/compression engine 150 reads a Dword that is different from the preceding Dword. The count value of this repeat count record is the value of the compression counter 151. The compression counter 151 is reset to zero after the repeat count is written.

When the trace formatting/compression engine 150 reads the first Dword or DC-Idle, it causes timestamp generator 170, which may be a counter in some embodiments, to begin counting. Timestamp generator 170 continues to count until trace formatting/compression engine 150 reads a new Dword or DC-Idle. The resulting timestamp identifies the length of time from the first Dword or DC-Idle to the new Dword or DC-Idle inserted by trace formatting/compression engine 150 in capture memory 160 after the repeat count record gets written. The timestamp allows the accurate recreation of the DC-Idles and Data Bursts that happened on the line. Use of the timestamp also allows a user of network diagnostic component 130 to ascertain how long the Data Burst and DC-Idle periods lasted.

The new Dword or DC-Idle is also written by trace formatting/compression engine 150 into the capture memory. Any subsequent Dwords or DC-Idles that are the same will be counted and written into the memory 160 as described. A timestamp of this length of time will also be written as described. This process may continue any time a Dword or DC-Idle that is different from a preceding Dword or DC-Idle is read by trace formatting/compression engine 150.

A specific example will now be described. Note that the numbers of Dwords or DC-Idles used in the example is for illustration only and should not be used to limit the scope of the appended claims. Referring to FIG. 2, Dword aligned data 145 includes 5 DC-Idles, labeled as DCI, followed by six Data Burst Dwords, labeled as Burst. Trace formatting/compression engine 150 reads the first DCI and writes it into capture memory 160 as represented by 161. Since there are four DCIs that follow, trace formatting/compression engine 150 records 4 repeat counts from compression counter 151 in the capture memory as represented by 162. A timestamp 163 that records the length of time of the DCIs is generated by timestamp generator 170 and also written in the capture memory.

Following the DCIs are the six Data Burst Dwords. Trace formatting/compression engine 150 takes the first Burst Dword and writes it into capture memory 160 as represented by 164. Since there are five Burst Dwords that follow, trace formatting/compression engine 150 records 5 repeat counts in the capture memory as represented by 165. A time stamp 166 is also generated by timestamp generator 170. Note that the capture memory 160 also includes ellipses 167 that illustrates that any number of additional OOB records may be recorded as necessary depending on the number of DC-Idles and Data Burst Dwords in Dword aligned data 145.

The Data Burst Dword and or DC-Idle data stored in the capture memory 160 by the method described above may then be displayed using an attached display device or otherwise accessed by a user of network diagnostic component 130. This allows the user to verify that the timing of an OOB signal is as expected. If the timing of the signal is not as expected, then corrective action may be taken.

For example, the COMSAS OOB signal previously described typically contains DC-Idles followed by Data Bursts, which typically are ALIGN primitives. The DC-Idle time for COMSAS is approximately 960 nanoseconds (ns)

and the Data Burst time is 120 ns. At 3 Gbps speed, the Dword granularity is typically 13.3 ns. Hence, the count for the DC-Idle time will be 72 Dwords. The count for the Align Data Bursts will be 9 Dwords. From this, diagnostic component 130 is able to detect that a received signal 180 is a COMSAS signal. This may be displayed as shown in Table 2 below.

TABLE 2

| Timestamp | Count | Decode |
|---|---|---|
| T1 | 72 | DC-Idle |
| T2 | 2 | Data Burst |
| T3 | 72 | DC-Idle |
| T4 | 2 | Data Burst |
| T5 | 72 | DC-Idle |
| T6 | 2 | Data Burst |
| T7 | 72 | DC-Idle |
| T8 | 2 | Data Burst |
| T9 | 1 | COMSAS detected |

Speed negotiation data stored in the capture memory 160 may similarly be displayed and analyzed by a user. For example, during SAS speed negotiation, a SAS host/target has to transmit DC-Idles for approximately 500 µs. Then, if a first SAS device supports a particular speed, it has to transmit ALIGN0 data to a second SAS device and wait for ALIGN1 data in reply from the second SAS device. When the ALIGN1 data is received from the second SAS device, the first SAS device has to transmit ALIGN1 data back to the second SAS device. This process is indicated in table 3 below. The SAS device in the example supports 1.5 Gbps SAS speed (which is indicated has Successful G1 speed detected). The count numbers are based on the 13.3 ns per Dword granularity discussed above.

TABLE 3

| Timestamp | Count | Decode |
|---|---|---|
| T1 | 37509 | DC-Idle |
| T2 | 6750 | Data Burst ALIGN0 |
| T3 | 750 | Data Burst ALIGN1 |
| T4 | 1 | Successful G1 speed detected |

Capture RCDT and SNTT Decodes for SAS Speed Negotiation

RCDT and SNTT are special timers used in a SAS speed negotiation sequence. A SAS transmitter is typically supposed to send DC-Idles for a certain amount of time in between the different speed negotiation rates. The length of time for which the DC-Idle is transmitted between the different speed negotiation rates is called Rate Change Delay Time, abbreviated as RCDT. The value of RCDT is defined by the SAS protocol to be approximately 503 micro seconds.

Similarly, a SAS transmitter that supports a physical link rate is supposed to send speed negotiation Data Dwords for a defined period of time. A successful SAS speed negotiation window typically consists of ALIGN0 primitive Dwords followed by ALIGN1 primitive Dwords. The time during which the ALIGN0 and ALIGN1 primitive Dwords are transmitted during a successful speed negotiation window is called Speed Negotiation Transmit Time, abbreviated as SNTT. The value of SNTT is specified by the SAS protocol as approximately 110 microseconds.

Often during the speed negotiation sequence, it is desirable for a user of network diagnostic component 130 to view the values of the RCDT and SNTT speed negotiation timers. This would allow the user to ascertain if the speed negotiation sequence was properly being performed and to take corrective action if warranted. However, conventional network diagnostic devices do not allow a user to view the RCDT and SNTT values. The principles of the present invention provide for showing these values.

Figure 3:
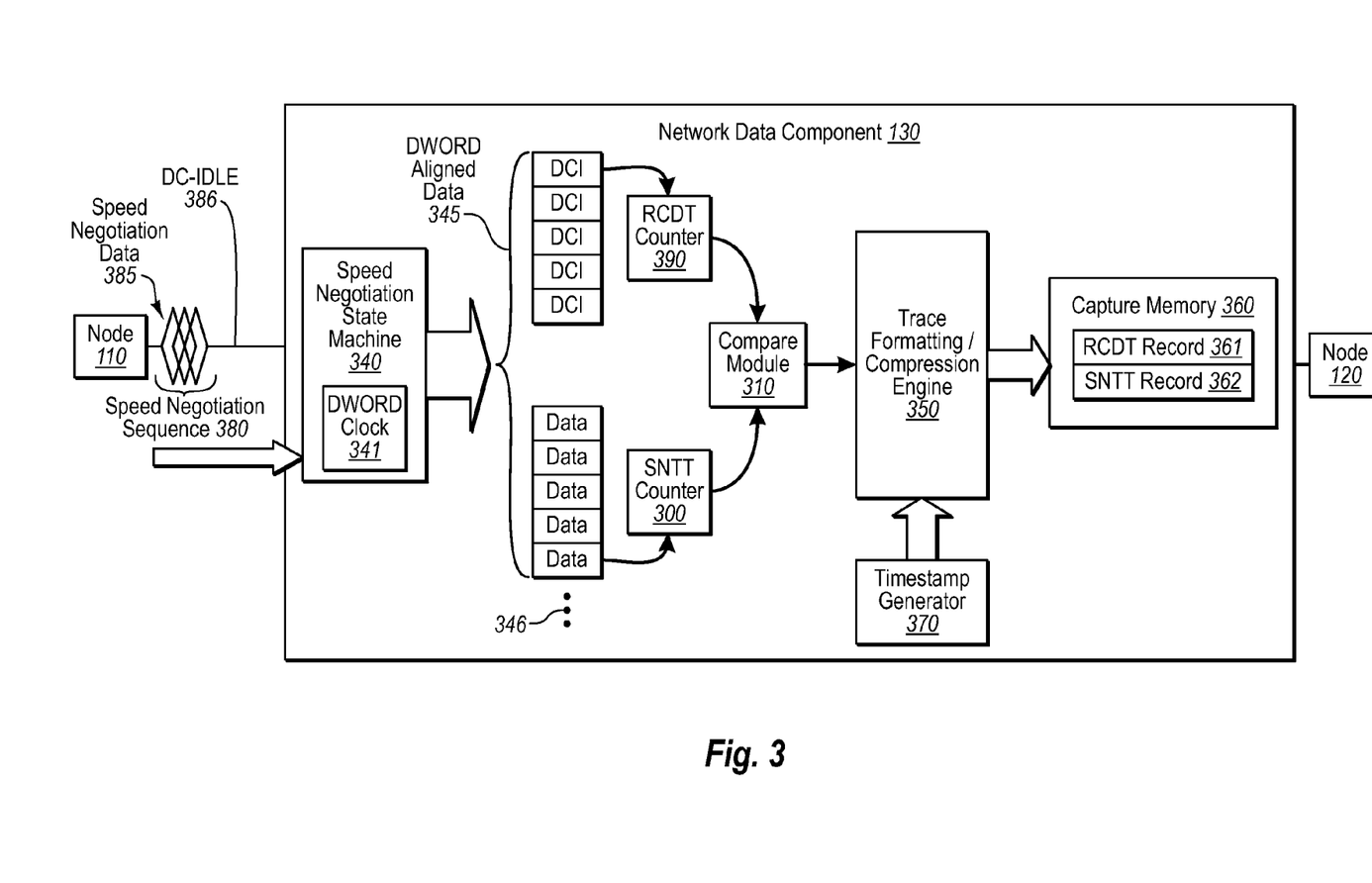
FIG. 3 illustrates a detailed view of a particular embodiment of the network diagnostic component of FIG. 1.

Referring to FIG. 3, an alternative embodiment of network diagnostic component 130 is shown. FIG. 3 shows that network diagnostic component 130 includes a speed negotiation state machine 340, a capture memory 360, a timestamp generator 370, a trace formatting/compression engine 350, a RCDT counter 390, a SNTT counter 300 and a compare module 310. Components 390 and 300 are used to measure the RCDT and SNTT and verify that they are correct.

Trace formatting/compression engine 350 may be implemented as software, hardware, or any combination of software and hardware. In like manner, the RCDT and SNTT counters 390 and 300 and compare module 310 may also be implemented as software, hardware, or any combination of software and hardware. Note that embodiment of FIG. 3 is only one example of the countless ways that the components of network diagnostic component 130 may be laid out.

As illustrated, speed negotiation state machine 340 may be implemented as any reasonable state machine. The speed negotiation state machine 340 samples an incoming speed negotiation sequence 380 from the wire using an internal Dword clock 341. The speed negotiation sequence 380 comprises speed negotiation DC-Idle stream 386 and speed negotiation Data Dwords 385.

Speed Negotiation state machine 340 then generates Dword aligned data 345 that represents the DC-Idle (DCI) and the speed negotiation Data Dwords (DATA) detected from speed negotiation sequence 380. Note that Dword aligned data 345 includes ellipses 346 following the DCI block and the data block. This is to illustrate that the DC-Idle and speed negotiation data portions of the speed negotiation sequence 380 are typically many Dwords in size. Accordingly, the number of DC-Idle (DCI) and speed negotiation Data Dwords depicted is for illustration only and is not meant to imply a required number of Dwords.

The DCI portions of Dword aligned data 345 are then passed to the RCDT counter 390. The data portions of Dword aligned data 345 are passed to the SNTT counter 300. The RCDT counter 390 and SNTT counter 300 are used to count the number of DCI and Data Dwords respectively. The output of both counters is provided to or otherwise made accessible to compare module 310, where the counted number is compared with a desired count number that equals the specified time of approximately 503 micro seconds for RCDT and 110 micro seconds for SNTT.

A record of the comparison and the total count of the DC-Idles is then created and stored in capture memory 360 by the trace formatting/compression engine 350 as illustrated by RCDT record 361. A timestamp generated by timestamp generator 370, which may be a counter in some embodiments, is affixed by trace formatting/compression engine 350 to the total count of DC-Idles and to the comparison and included in the RCDT record 361. The timestamp allows for the accurate recreation of the duration of the DC-Idles (and speed negotiation data as will be described) that occurred on the line.

As in the RCDT case, a record of the comparison and the total count of speed negotiation Data Dwords is created and stored in capture memory 360 as illustrated by SNTT record 362. A timestamp generated by timestamp generator 370 is also affixed by trace formatting/compression engine 350 to the total count of speed negotiation Data Dwords and to the comparison and included in the SNTT record 362.

The RCDT record 361 and SNTT record 362 may then be accessible to a user of network diagnostic component 130 using an attached video display or like device. For example, if the measured DC-Idle count compares with the desired count, then RCDT record 361 will specify that a good RCDT was detected. On the other hand, if the measured DC-Idle count does not compare with the desired count, then RCDT record 361 will specify that a bad RCDT was detected or may simply specify this by the lack of an indication that a good RCDT was detected. In like manner, the SNTT record 362 will specify that a good SNTT was detected if the measured speed negotiation Data Dword count compare with the desired count. The SNTT record 362 will likewise not specify a good SNTT was detected if the measured and desired speed negotiation Data Dword counts do not match.

A specific example of an RCDT and SNTT decode process will now be described with reference to Table 4.

TABLE 4

| Timestamp | Count | Decode |
|---|---|---|
| T1 | 37734 | DC-Idle |
| T2 | 1 | Good RCDT detected |
| T3 | 1500 | ALIGN0 |
| T4 | 6751 | ALIGN1 |
| T5 | 1 | Good SNTT detected |

During a SAS speed negotiation sequence, a SAS host transmits a data sequence 380 consisting first of DC-Idle and then speed negotiation Data Dwords. For example, if the SAS device, such as node 120, supports a particular speed, it typically transmits DC-Idle followed by ALIGN0 primitive Data Dwords to node 110 and then waits for an ALIGN0 Data Dword reply from node 110. When the ALIGN0 Data Dword reply is received, node 120 then transmits ALIGN1 primitive Data Dwords and likewise waits for a reply from node 110. The ALIGN0 and ALIGN1 Data Dword sequence make up the data portion of the speed negotiation sequence 380.

The data sequence 380 is received by state machine 340 as described above. The DC-Idle duration is counted by RCDT counter 390, which counts 37734 DC-Idles. This value is time stamped T1. This DC-Idle count is compared by compare engine 310 with a desired DC-Idle count. Since a Dword is approximately 13.3 nanoseconds long at 3 Gbps, the 37734 DC-Idle count approximately equals the desired 503 microseconds. A RCDT record is generated that is one Dword in size and is time stamped T2. The RCDT record specifies that a good RCDT was detected.

The duration of the speed negotiation Data Dwords are counted by SNTT counter 300, which counts 1500 ALIGN0 Dwords and 6751 ALIGN1 Dwords for a total count of 8251 Dwords. These count values are time stamped T3 and T4 respectively. This Dword count is compared by compare engine 310 with the desired Dword count. The 8251 Dword count approximately equals the desired 110 microseconds. A SNTT record is generated that is one Dword in size and is time stamped T5. The SNTT record specifies that a good SNTT was detected.

Show OOB and Speed Negotiation Data Graphically

Figure 5:
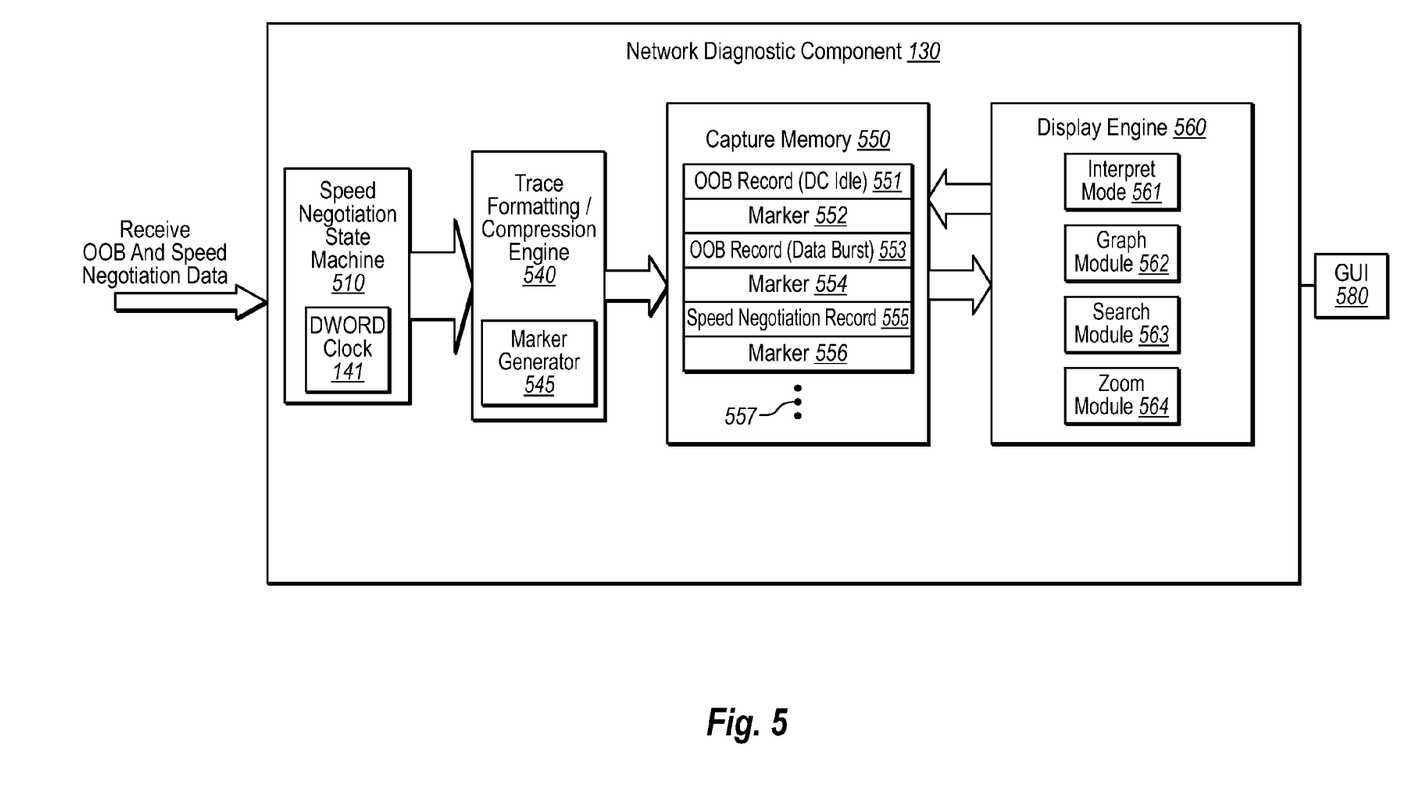
FIG. 5 illustrates a detailed view of a particular embodiment of the network diagnostic component of FIG. 1.

Referring to FIG. 5, a further embodiment of network diagnostic component 130 is shown. FIG. 5 shows that network diagnostic component 130 includes a speed negotiation state machine 510, which corresponds to the speed negotiation state machines previously described, a trace formatting/compression engine 540, a capture memory 550, and a display engine 560. Note that the embodiment of FIG. 5 is only one example of the countless ways that the components of network diagnostic component 130 may be laid out. Further note that the embodiment of FIG. 5 may include other components not illustrated.

As with the other embodiments previously discussed, trace formatting/compression engine 540 may be implemented as software, hardware, or any combination of software and hardware. Trace formatting/compression engine 540 receives the OOB and speed negotiation data as already explained in relation to FIGS. 2 and 3 and writes the captured data into capture memory 550 as illustrated as OOB record 551, OOB record 553, and speed negotiation record 555. Note that capture memory 550 may correspond to the capture memories previously described in relation to FIGS. 2 and 3 and thus need not be described further here.

As illustrated, in this embodiment trace formatting/compression engine 540 also includes a marker generator 545. Marker generator 545, which may be implanted as any marker generator known in the art, is configured to superimpose or write one or more markers onto the captured OOB and speed negotiation data. The one or more markers may be meta-data or the like or may be any reasonable markers known in the art. The one or more markers may mark the start of the OOB or speed negotiation data sequence, the end of the OOB or speed negotiation data sequence, specific OOB or speed negotiation events, or any combination thereof Of course it will be appreciated that other information may also be included in the one or more markers For example, any time that trace formatting/compression engine 540 receives OOB and speed negotiation data, marker generator 545 may superimpose or write the one or more markers onto the captured data. These markers are then written by trace formatting/compression engine 540 into capture memory 550.

As illustrated, a marker 552 is written in capture memory 550 for OOB record 551. In like manner, a marker 554 and 556 are written in capture memory 550 for OOB record 553 and speed negotiation record 555 respectively. As mentioned, markers 552, 554, and/or 556 may include meta-data specifying the start and stop of the OOB or speed negotiation sequence or any specific event about the OOB and speed negotiation sequences. Note that ellipses 557 illustrate that any number of additional OOB and speed negotiation records and their accompanying markers may also be stored in capture memory 550.

As mentioned, network diagnostic component 130 also includes a display engine 560. Display engine 560, as well as the various modules and components that comprise display engine 560, may be implemented as hardware, software, or any combination of hardware and software. In operation, display engine 560 is configured to interpret and then graphically display as a Graphical User Interface (GUI) the OOB and speed negotiation records stored in capture memory 550. Advantageously, providing a GUI of the OOB and speed negotiation data allows a user of network diagnostic component 130 the ability to visually inspect the OOB and speed negotiation signals transmitted between nodes 110 and 120. The user may then be able to quickly ascertain if the initialization between nodes 110 and 120 is correct based on the visual representation of the received OOB and speed negotiation signals. The visual display of the OOB and speed negotiation signals augments the time stamps and charts as explained in relation to FIGS. 2 and 3 and also provides an effective method of trouble-shooting problems related to complex low-level state machines.

Display engine 560 includes an interpret module 561. In operation, interpret module 561 is configured to access OOB records 551 and 553 and/or speed negotiation record 555 in capture memory 550 and to also access the corresponding markers 552, 554, and 556. From this accessed information, interpret module 561 is able to ascertain all the required information about the captured data needed so as to allow a graphical representation of the data to be created.

For instance, interpretation module 561 is able to ascertain the type of OOB and/or speed negotiation data that is recorded in the capture memory 550. In certain embodiments, the interpret module 561 post-processes the OOB record 551, marker 552, etc to generate additional state information needed to graphically display the data. For instance, the interpret module 561 may generate missing markers caused by the wrapping of capture buffer pointers.

A graph module 562 is also part of display engine 560. In operation, graph module 562 is configured to generate and display the graphical representation of the captured OOB and speed negotiation data. For example, the graph module 562 uses the information determined by interpret module 561 (i.e., type and duration of the captured signal) and creates a graphical representation of the captured OOB and/or speed negotiation signals. The graph module 562 displays the graphical representations of the signals as a GUI 580, which is illustrated in FIG. 5 as being displayed on a monitor or like device. Note that the display monitor may be part of network diagnostic component 130 or it may be a separate monitor that is coupled to network diagnostic component 130.

Display engine 560 may also include other modules that perform various functions that add to the performance of GUI 580. For example, a search module 563 is included. In operation, search module 563 is configured to receive user input specifying a certain OOB or speed negotiation signal type that a user desires to view. Search module 563 is then able to cause interpret module 561 and graph module 562 to find and display the desired signal type.

A zoom module 564 may also be included. Zoom module 564 is configured to receive user input specifying that a user desires to zoom in on a portion of a graph currently being shown by GUI 580. Zoom module 564 is configured to cause graph module 562 to zoom in on the desired portion. Of course, zoom module 564 may also be used to zoom out a view of a graph is so desired by a user. Note that, as will be appreciated by one of skill in the art, display engine 560 may include other modules not illustrated or described. Further, it will also be appreciated that although the modules described as configuring display engine 560 are illustrated as separate modules, they may be implemented as a single module or a subset of the total number of modules may be combined into one or more modules.

As mentioned, the graphical representation of the captured OOB and speed negotiation signals or data may be displayed as GUI 580. The GUI 580 may be configured to include various user interfaces and other features that allow a user to quickly and easily view or navigate the displayed graphical representation of the captured OOB and speed negotiation signals or data.

Figure 6A:
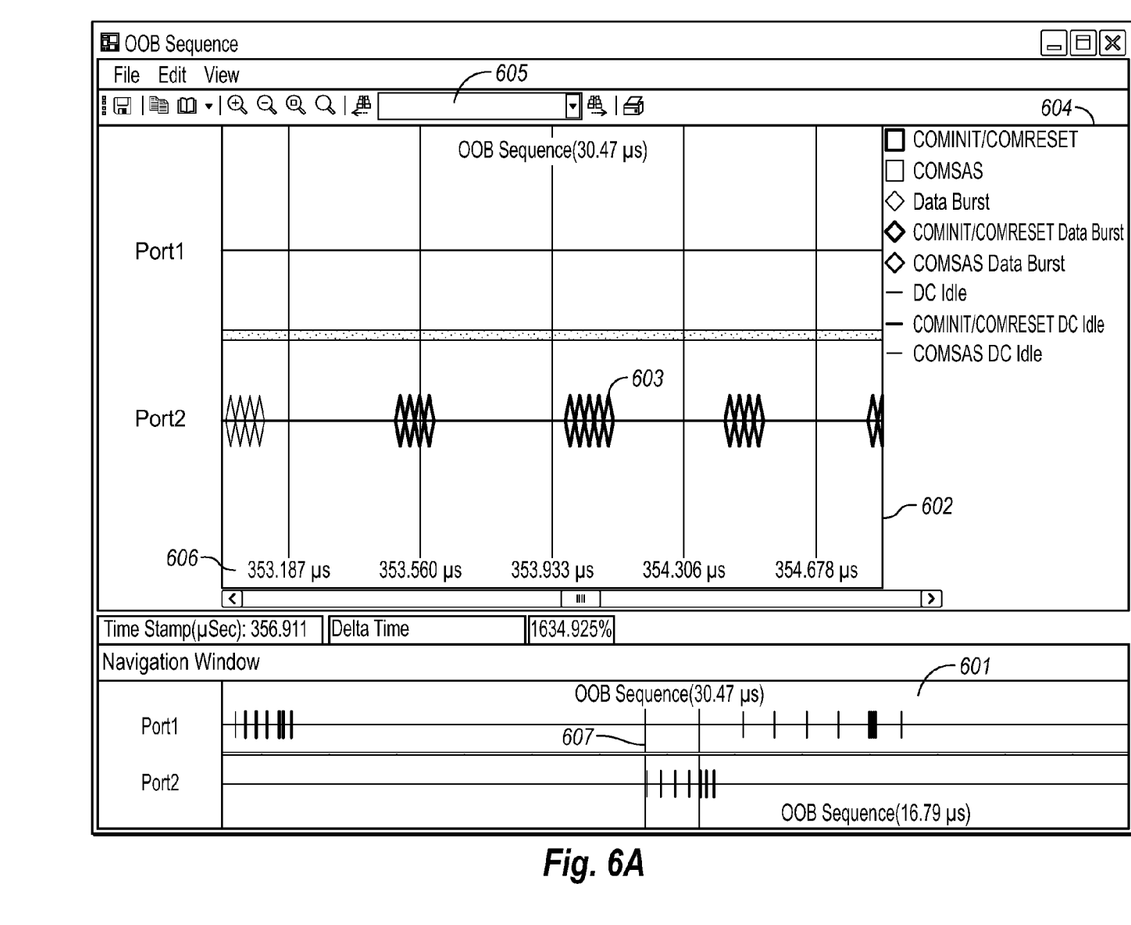
FIGS. 6A and 6B illustrate a view of a Graphical User Interface in accordance with the principles of the present invention.
Figure 6B:
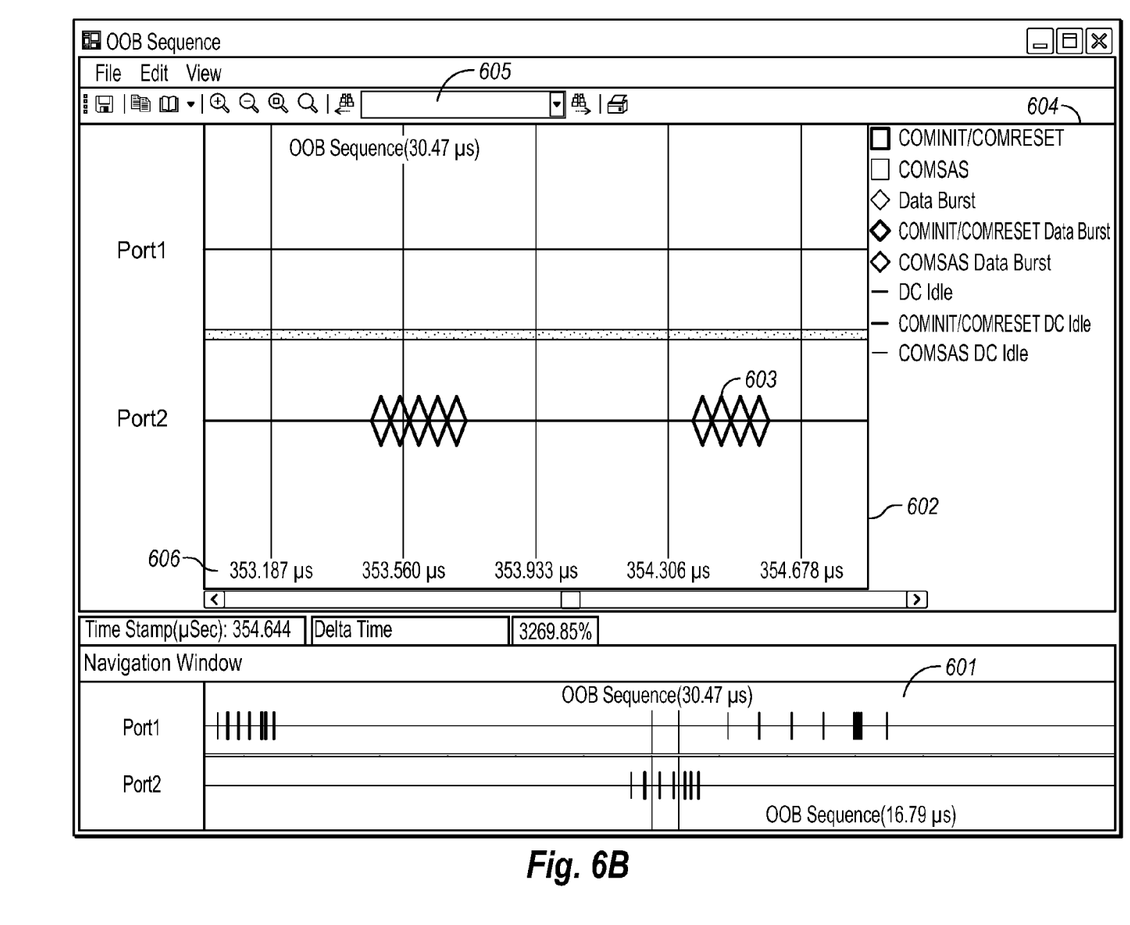
Figure 7:
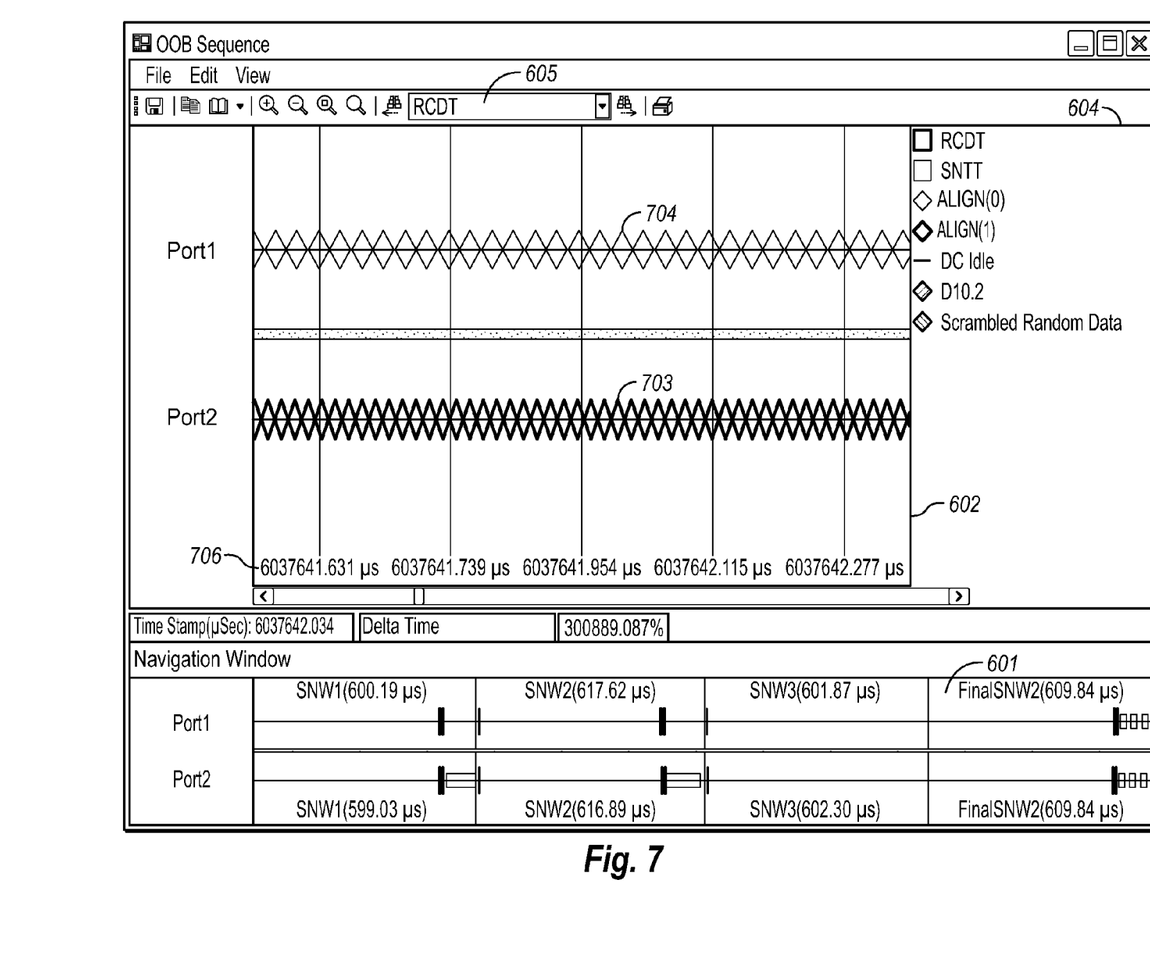
FIG. 7 illustrates an alternative view of a Graphical User Interface in accordance with the principles of the present invention.

For example, one embodiment of GUI 580 is illustrated in FIGS. 6A, 6B and 7. As illustrated in FIG. 6A, GUI 580 shows the OOB sequence captured from both a port 1 and a port 2, which may correspond to nodes 110 and 120 respectively. Further, GUI 580 includes a lower navigation window 601 that displays a summary view of the OOB sequence and the time duration of the sequences.

GUI 580 also includes an upper zoomed window 602 that displays the portion of navigation window 601 highlighted by box 607. The upper window 602 displays an OOB sequence 603 that shows the Data Bursts and DC-Idle portions of the sequence. Further, a key 604 includes information that identifies the type of OOB sequence displayed and also identifies the overall types of information that may be displayed. For example, key 604 specifies that this Data Burst corresponds to a COMINIT/COMRESET Data Burst. Other colors in the key 604 correspond to other types of Data Bursts and to DC-Idles. A time line 606 is included that display the duration of the displayed Data Bursts and DC-Idles.

GUI 580 further includes a search box or pull down menu 605. Search box or pull down menu 605 allows a user to specify the type of OOB signal they desire to view. For example, as illustrated FIG. 5 shows COMINIT/COMRESET Data Bursts. A user may select in search box 605 to view COMSAS Data Bursts, which would cause GUI 580 to display these OOB signals. Note that the information input into box 605 may correspond to the user input for search module 563 previously discussed.

GUI 580 may also allow a user to zoom in or zoom out of a portion of the displayed OOB sequence. For example, in some embodiments GUI 580 may allow a user to drag a mouse cursor over a desired portion of the displayed OOB sequence to specify a desired portion to zoom in on. Of course, other methods of specifying the desired zoom portion may also be implemented. FIG. 6B illustrates a zoomed in display of the OOB sequence displayed in FIG. 6A. Note that user specification of the desired zoom portion may correspond to the user input for zoom module 564 previously discussed.

FIG. 7 illustrates that GUI 580 may also be configured to display a speed negotiation sequence. As illustrated, GUI 580 again includes both the navigation window 601 and zoomed window 602 that show the speed negotiation sequences received at ports 1 and ports 2 from nodes 110 and 120. Further, key 604 illustrates the type of speed negotiation data currently being displayed and the overall types of speed negotiation data that may be displayed. In addition, box or pull down menu 605 allows the user to pick other types of OOB or speed negotiation data to navigate to as previously described.

As illustrated in FIG. 7, GUI 580 shows speed negotiation sequences 703 and 704, which according to key 604 are an ALIGN(1) and ALIGN(0) respectively. As previously described, these two signals are used in the speed negotiation process. Note that according to key 604 the RCDT and SNTT timers previously discussed may also be displayed. A time line 706 is included to show the duration of the speed negotiation sequences.

Figure 8:
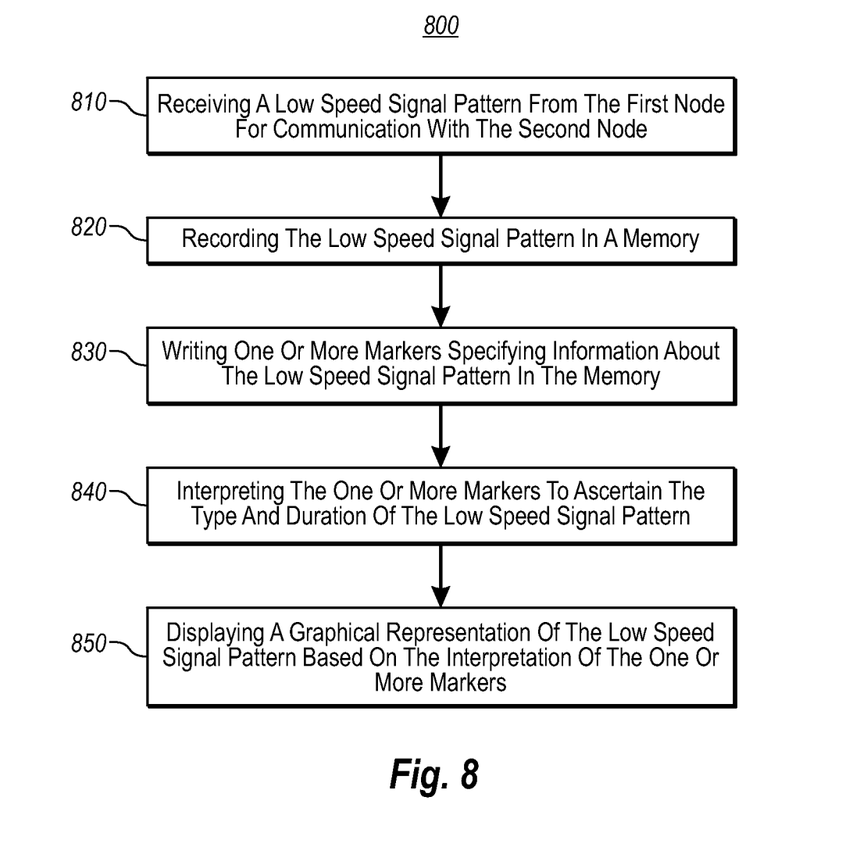
FIG. 8 illustrates a flowchart of a method for a network diagnostic component to graphically display received low speed signal patterns.

FIG. 8 shows a flow chart of a method 800 a network diagnostic component that is placed in-line between first and second nodes in a network to graphically display received low speed signal patterns. The method will be described in relation to the environment previously described in relation to FIG. 5, although it will be appreciated that method 800 may be practiced in other environments. At 810, a low speed signal pattern from the first node for communication with the second node is received. For example, the low speed signal pattern may be received by the speed negotiation state machine 510 as previously described. At 820, the low speed signal pattern is recorded in a memory as previously described. For example, the trace formatting/compression engine 540 may record the signal pattern in capture memory 550. At 830, one or more markers specifying information about the low speed signal pattern is written in the memory. For example, marker generator 545 may write the one or more markers in capture memory 550 as previously described. At 840, the one or more markers are interpreted to ascertain the type and duration of the low speed signal pattern. For example, display engine 560, specifically interpret module 561, may interpret the marker as previously described. At 850, a graphical representation of the low speed signal pattern is displayed based on the interpretation of the one or more markers. For example, display engine 560, specifically graph module 562, may display the graphical representation as previously described. The graphical representation may be a GUI as also previously described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method for a network diagnostic component that is placed in-line between first and second nodes in a network to graphically display received low speed signal patterns, the method comprising:
   an act of receiving a low speed signal pattern from the first node for communication with the second node, the low-speed signal pattern comprising one or more sequences of repeated Dwords and repeated DC-Idles;
   an act of creating a compressed record of the low speed signal pattern in a memory, said act comprising recording in the memory each sequence of repeated Dwords or DC-Idles in the form of a single said Dword or DC-Idle and a repeat count value therefor;
   an act of writing in the memory one or more markers specifying a start and a completion of a speed negotiation signal or a low speed signal specified by a communication protocol;
   an act of interpreting the compressed record and the one or more markers to ascertain the type and duration of the low speed signal pattern; and
   an act of displaying a graphical representation of the low speed signal pattern based on the interpretation of the compressed record and the one or more markers.

2. The method in accordance with claim 1, wherein the graphical representation is displayed as a Graphical User Interface (GUI).

3. The method in accordance with claim 2, wherein the GUI comprises a navigation window configured to display a summary view of the recorded low speed signal pattern and the time duration of the recorded low speed signal pattern.

4. The method in accordance with claim 2, wherein the GUI comprises a navigation window configured to display a zoomed view of a subset of the recorded low speed signal pattern that has been selected by a user.

5. The method in accordance with claim 2, wherein the GUI comprises a first navigation window configured to display a summary view of the recorded low speed signal pattern and the time duration of the recorded low speed signal pattern and a second navigation window configured to display a zoomed view of a subset of the recorded low speed signal pattern shown in the first navigation window that has been selected by a user.

6. The method in accordance with claim 1, wherein the low speed signal pattern comprises at least one of an Out-Of-Band (OOB) data sequence and a speed negotiation sequence.

7. The method in accordance with claim 6, wherein the Out-Of-Band (OOB) data sequence and the speed negotiation sequence comprise Data Bursts or DC-Idle.

8. The method in accordance with claim 1, wherein the network diagnostic component is a SAS/SATA network diagnostic component.

9. The method in accordance with claim 1, wherein the first and second nodes are SAS/SATA nodes.

10. A network diagnostic component placed in-line between first and second nodes in a network, the network diagnostic component comprising:
    a memory;
    a first module configured for receiving a low speed signal pattern from the first node for communication with the second node, the low-speed signal pattern comprising one or more sequences of repeated Dwords and repeated DC-Idles;
    a second module configured to create a compressed record of the low speed signal pattern in the memory, said act comprising recording in the memory each sequence of repeated Dwords or DC-Idles in the form of a single said Dword or DC-Idle and a repeat count value therefor;
    a third module configured to write one or more markers in the memory, the one or more markings specifying a start and a completion of a speed negotiation signal or a low speed signal specified by a communication protocol;
    a fourth module configured to interpret the compressed record and the one or more markers to ascertain the type and duration of the low speed signal pattern; and
    a fifth module configured to display a graphical representation of the low speed signal pattern based on the interpretation of the one or more markers.

11. The network diagnostic component in accordance with claim 10, wherein the graphical representation is displayed as a Graphical User Interface (GUI).

12. The network diagnostic component in accordance with claim 11, wherein the GUI comprises a navigation window configured to display a summary view of the recorded low speed signal pattern and the time duration of the recorded low speed signal pattern.

13. The network diagnostic component in accordance with claim 11, wherein the GUI comprises a navigation window configured to display a zoomed view of a subset of the recorded low speed signal pattern that has been selected by a user.

14. The network diagnostic component in accordance with claim 11, wherein the GUI comprises a first navigation window configured to display a summary view of the recorded low speed signal pattern and the time duration of the recorded low speed signal pattern and a second navigation window configured to display a zoomed view of a subset of the recorded low speed signal pattern shown in the first navigation window that has been selected by a user.

15. The network diagnostic component in accordance with claim 10, wherein the one or more markers mark the start of the low speed signal pattern, the end of the low speed signal pattern, the duration of the low speed signal pattern, or any combination thereof.

16. The network diagnostic component in accordance with claim 10, wherein the low speed signal pattern comprises an Out-Of-Band (OOB) data sequence and/or a speed negotiation sequence.

17. The network diagnostic component in accordance with claim 10, further comprising a sixth module configured to receive user input specifying a portion of the low speed signal pattern and configured to cause the fourth and fifth modules to find and display the specified portion.

18. The network diagnostic component in accordance with claim 10, further comprising a sixth module configured to receive user input specifying a portion of the low speed signal pattern to be displayed as a zoomed in view or a zoomed out view and configured to cause the specified portion to be displayed in the zoomed in view or a zoomed out view.

19. The network diagnostic component in accordance with claim 10, wherein the first and second nodes are SAS/SATA nodes and the network diagnostic component is a SAS/SATA network component.

* * * * *